United States Patent
Schilz

(10) Patent No.: US 7,004,292 B2
(45) Date of Patent: Feb. 28, 2006

(54) ADJUSTING ELEMENT HAVING A CYLINDER WITH PRESSURE RELIEF

(75) Inventor: Arnold Schilz, Lahnstein (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 10/886,121

(22) Filed: Jul. 6, 2004

(65) Prior Publication Data
US 2005/0011711 A1    Jan. 20, 2005

(30) Foreign Application Priority Data
Jul. 15, 2003   (DE) .............................. 103 31 921

(51) Int. Cl.
F16F 9/52     (2006.01)
(52) U.S. Cl. ............. 188/276; 188/322.21; 188/321.17
(58) Field of Classification Search ........... 188/322.21, 188/321.11, 321.17, 276, 277, 278; 267/64.28, 267/129
See application file for complete search history.

(56) References Cited

U.S. PATENT DOCUMENTS

| | | |
|---|---|---|
| 4,901,594 A | 2/1990 | Selzer |
| 5,485,987 A | 1/1996 | Jobelius et al. |
| 5,735,371 A * | 4/1998 | Jobelius et al. ............. 188/276 |
| 5,862,893 A | 1/1999 | Völpel |
| 6,019,356 A * | 2/2000 | Ayyildiz et al. ............ 267/139 |
| 2004/0079225 A1 | 4/2004 | Reiser |

FOREIGN PATENT DOCUMENTS

| | | |
|---|---|---|
| DE | 2 245 258 | 3/1974 |
| DE | 42 16 573 C2 | 6/1994 |
| DE | 102 02 415 C1 | 4/2003 |

* cited by examiner

Primary Examiner—Melody M. Burch
(74) Attorney, Agent, or Firm—Cohen, Pontani, Lieberman & Pavane

(57) ABSTRACT

A cylinder has an interior space which contains a medium under pressure. A piston is displaceably arranged in the cylinder and has a piston rod which projects from the cylinder at one end of the cylinder. The piston rod is enclosed by an annular seal having an inner radially encircling circumference which bears against the piston rod and an outer radially encircling circumference which bears against the inner wall of the cylinder, a side facing the interior space to which the pressure of the medium is applied, and a side remote from the interior space supported on a supporting element. The supporting element, in turn, is supported on part of the cylinder. The supporting element includes a safety element which is designed to shorten its axial length during thermal overloading, as a result of which a passage opens from the interior space of the cylinder to the environment. The safety element is made of a melting or subliming material.

12 Claims, 3 Drawing Sheets

ADJUSTING ELEMENT HAVING A CYLINDER WITH PRESSURE RELIEF

BACKGROUND OF THE INVENTION

1. Field of the Invention

The invention relates to an adjusting element having a cylinder, the interior space of which contains a medium under pressure, a piston which is displaceably arranged in the cylinder and has a piston rod which projects from the cylinder at one end of the cylinder, and an annular seal which bears tightly with its inner radially encircling circumference against the piston rod and with its outer radially encircling circumference against the inner wall of the cylinder. The pressure of the medium is applied to the seal on its side facing the interior space; its side remote from the interior space is supported on a supporting element which in turn, with its end remote from the annular seal, is supported on part of the cylinder, and having a safety element which is made of a meltable material, as a result of which a passage opening can be produced from the interior space of the cylinder to the environment.

2. Description of the Related Art

In such adjusting elements, which are preferably gas springs, the interior space filled with the medium can be connected to the environment if a certain internal pressure in the cylinder is exceeded in order to avoid a high internal pressure in the cylinder. An excessively high internal pressure, which may occur due to a temperature increase, for example in the event of a fire in the environment of the adjusting element, may result in the cylinder being destroyed or in the piston rod being forced out of the cylinder.

Gas springs of this type can be pneumatic adjusting elements for easy manipulation of the luggage trunk or the hood of a motor vehicle, these adjusting elements forming a counterbalance for the parts adjusted.

U.S. Pat. No. 5,485,987 discloses an adjusting element of the type mentioned at the beginning. If a certain bearing force of the annular seal against the supporting element is exceeded, the annular seal is displaced towards the discharge opening of the piston rod from the cylinder and thus clears a hole in the cylinder, via which the interior space of the cylinder is connected to the environment, so that the medium contained in the cylinder can escape into the environment. In this case, it is a disadvantage that moisture can enter the cylinder through the hole, a factor which leads to corrosion.

U.S. Pat. No. 5,862,893 discloses an adjusting element whose piston rod is centred relative to the cylinder by a piston-rod guide. An annular seal which is secured by the piston-rod guide and a fixing sleeve is provided in order to seal the piston rod. The position of the fixing sleeve is determined by an encircling bead in the cylinder. Provided further downstream of the bead is a second sleeve which is prestressed relative to the inside diameter of the cylinder and is thus held radially and axially in its installed position. The second sleeve forms a stop for the piston and thus limits the outwards movement of piston and piston rod. The second sleeve is made of a material which can melt above a specific temperature. If the temperature increases above the specific temperature, the sleeve melts and the piston together with the piston rod can be displaced further outwards. In the process, a cross-sectional constriction arranged in the piston rod passes into the region of the annular seal, so that a bypass to the environment is created, via which bypass the gas contained in the cylinder can escape. This cross-sectional constriction of the piston rod, necessary in order to form the bypass, leads to weakening of the piston rod. Due to the arrangement of the sleeve made of meltable material, the adjusting device requires a larger axial construction space than conventional adjusting devices.

SUMMARY OF THE INVENTION

The object of the invention is to provide an adjusting element of the type mentioned at the beginning which avoids these disadvantages and, during a temperature increase and the associated pressure increase in the interior space of the cylinder beyond a certain internal pressure, leads to a reliable pressure relief of the interior space, and can be constructed with few simple components.

According to the invention, the safety element is made of a melting or subliming material and is a component together with the supporting element.

In normal operation, the supporting element serves to fix the annular seal. In the event of thermal overloading, it serves as a safety element in order to avoid a pressure increase which is caused by a temperature increase and would result in the cylinder being damaged or destroyed. If a specific temperature is exceeded, the supporting element melts or sublimes. As a result of the pressure in the interior space of the cylinder, the annular seal, due to the fact that the supporting element is no longer present or its axial length is reduced, is displaced towards the discharge opening from which the piston rod comes out of the cylinder. As a result, a passage opening is created from the interior space of the cylinder to a region connected to the environment, and this passage opening allows the medium under pressure, in particular a gas, to flow out of the interior space of the cylinder into the environment and thus reduces the pressure in the cylinder.

Due to the combination of the support and the securing by the supporting element, the adjusting element requires especially few components. It is thus of simple construction and requires no more axial construction space than conventional adjusting elements.

Sufficient strength of the supporting element for the supporting function together with a safety function which is sufficient in the event of thermal overloading is achieved if the material is a metal or a metal alloy having a low melting temperature. In particular, zinc, a zinc die-casting or precision zinc alloys having the trade name Zamak have proved to be advantageous.

To reduce the weight of the adjusting element, it helps if the supporting element is made of a thermoplastic. Sufficient strength for the function of the support is achieved by suitable design and/or additives, e.g. glass fibres.

The passage opening is formed by a groove arranged axially on the inner wall of the cylinder. The groove extends from the opening through which the piston rod passes out of the cylinder right up to the level of the supporting element. During the melting of the supporting element, the annular seal passes into the region in which the supporting element was previously arranged, so that the interior space of the cylinder is connected to the environment via the groove in the inner wall of the cylinder. The groove can be produced with little outlay during the production of the cylinder or can be produced subsequently.

In order to ensure sufficiently rapid discharge of the melting or subliming supporting element, the groove must have a certain cross-sectional area. Excessive weakening of the cylinder wall as a result of the cross-sectional area is avoided if the requisite cross-sectional area is formed by a plurality of grooves.

Provided the thermal overloading acts upon the adjusting element only from one direction, a uniform arrangement of preferably three or four grooves arranged in the cylinder wall at a distance apart of about 120° or 90°, respectively, ensures that the molten or subliming supporting element escapes in good time on the side subjected to the greatest load, even if the supporting element is not yet melted or sublimed in other regions as a result of the thermal conductivity. As a result, the passage opening for connecting the interior space of the cylinder to the environment is created at an earlier stage, and the loads leading to the destruction of the adjusting element can be reduced sooner.

A passage opening is likewise created by the supporting element having a stop which is made of a material having a higher melting point, is supported on the end wall and projects axially relative to the extent of the cylinder at least up close to the annular seal. As a result of the dissolving supporting element decreasing at least in its axial length, and as a result of the internal pressure, the annular seal is moved outwards, in the course of which it is acted upon by the stop at least one location in such a way that at least lifting of the annular seal from the inner wall of the cylinder occurs, if not damage to the annular seal.

The stop can be a pin-like plunger which acts upon the annular seal at one location.

The stop can be arranged next to the piston rod if the supporting element has a supporting disc which is made of a material having a higher melting point and rests for support on the beaded end wall of the cylinder. The supporting disc carries both the stop and the melting or subliming material of the supporting element. The use of such a supporting disc leads to an increase in the stability of the supporting element during normal operation, since dynamic processes in the melting or subliming material which reduce the strength, e.g. creep, are prevented.

The design of the stop as a separate component and its fitting is avoided if the stop is connected in one piece with the supporting disc. The production turns out to be especially cost-effective if the stop and supporting disc are designed as a stamped part.

The arrangement of grooves in the inner wall of the cylinder and holes at its beaded end wall can be avoided if the supporting disc has apertures in the form of slots which run radially inwards from the outer margin of the supporting disc, or if the supporting disc has a lattice structure. In the event of thermal overloading, the melting or subliming material escapes via the apertures to the environment. At the same time, the passage opening of the interior space of the cylinder to the environment is created via the said apertures.

The stability of the supporting disc is only slightly weakened by the slots if the radial length and the width of the slots is small. In particular the radial length of the slots preferably amounts to about one third of the radius of the supporting disc.

The apertures may have any desired configurations and arrangements. In addition to a design of the supporting disc with a lattice structure, an arrangement of the apertures which is simple to produce, with at the same time high stability of the supporting disc, is achieved with a uniformly distributed arrangement of the apertures on a circle.

The lifting of the annular seal from the inner wall of the cylinder or the piston rod by the stop is facilitated if the annular seal has an inner and/or outer sealing lip bearing against the piston rod and/or against the inner wall of the cylinder.

So that the sealing lips are certainly flexible, but the base of the annular seal is dimensionally stable, the annular seal may have a stabilizing ring made of material of lower flexibility than the material of the annular seal, and the stop can be moved axially past the stabilizing ring radially on the inside and/or outside.

DETAILED DESCRIPTION OF THE PRESENTLY PREFERRED EMBODIMENTS

Figure 1:
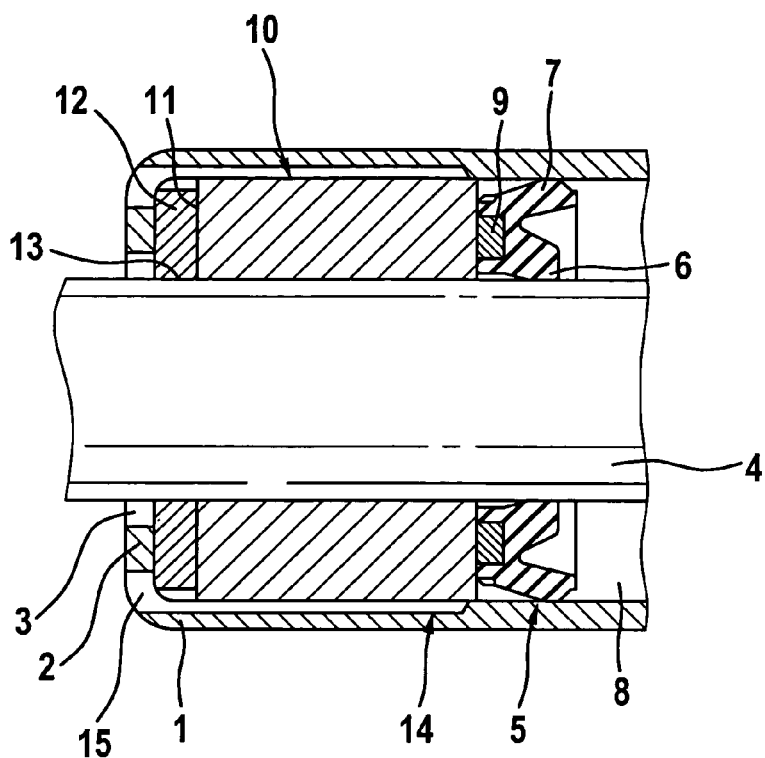
FIG. 1 shows a detail of a side view of a first exemplary embodiment of an adjusting element in the normal position, in section.

The adjusting element shown in the figures has a tubular cylinder 1, the wall of which is beaded at the one end of the cylinder 1 to form an end wall 2. A continuous passage opening 3 is formed in the end wall 2 coaxially to the longitudinal extent of the cylinder 1.

Displaceably arranged in the cylinder 1 is a piston (not shown) which has a piston rod 4 which projects outwards through the passage opening 3. The piston rod 4 is enclosed by an annular seal 5, the radially encircling inner sealing lip 6 of which bears against the piston rod 4 and the radially encircling outer sealing lip 7 of which bears against the inner wall of the cylinder 1. The sealing lips 6 and 7 are arranged on that side of the annular seal 5 which faces the interior space 8 of the cylinder 1 and are applied against the piston rod 4 and respectively the inner wall of the cylinder 1 by a gas which is located in the interior space 8 and is under pressure.

To stabilize the annular seal 5, it has on its side remote from the interior space 8 an inserted stabilizing ring 9 made of a material of lower flexibility than the material of the annular seal 5.

With its annular surface remote from the interior space 8, the annular seal 5 to which the gas pressure is applied is supported on a supporting element 10. This supporting element 10 is designed as a bush. The supporting element 10 is made of a precision zinc alloy. With its side 11 remote from the annular seal 5, the supporting element 10 rests on a disc 12, which, with its end face facing the end wall 2, bears against the end wall 2. A coaxial hole 13 in the disc 12 encloses the piston rod 4 and forms a guide for the piston rod 4.

The inner wall of the cylinder 1 in FIGS. 1 and 2 has four axially running grooves 14 which are distributed at a distance apart of 90° at the circumference and extend from the end wall 2 right up to a level directly below the annular seal 5. At their ends remote from the annular seal 5, the grooves 14 merge into holes 15 which pass through the end wall 2 of the cylinder 1.

Figure 2:
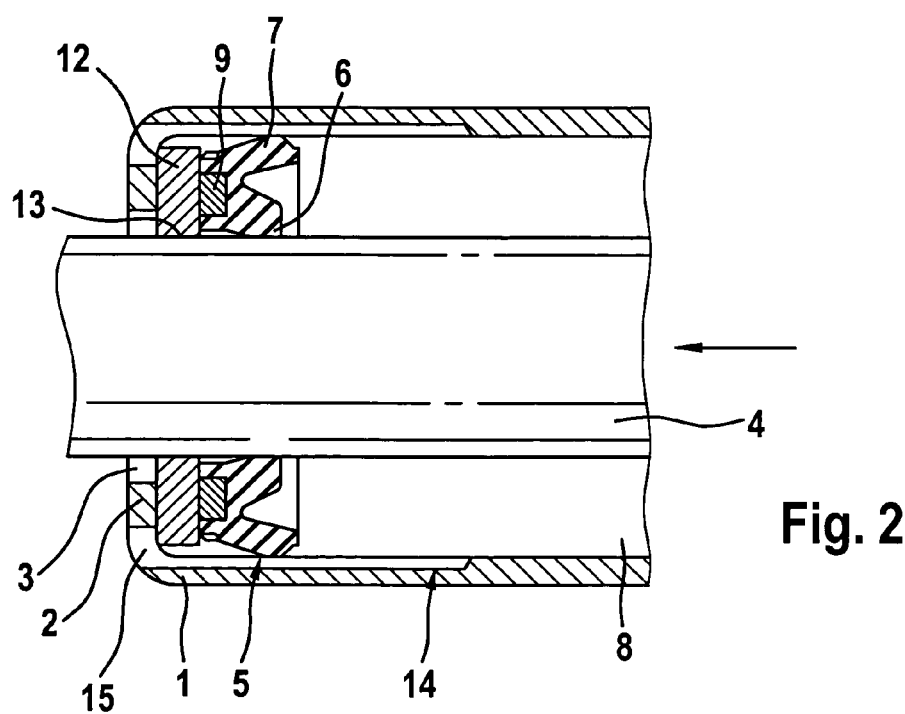
FIG. 2 shows the adjusting element according to FIG. 1 after thermal overloading.

FIG. 2 shows the adjusting element during thermal overloading. As a result of the action of heat, the supporting element 10 made of a precision zinc alloy melts. The molten precision zinc alloy passes to the environment via the grooves 14. At the same time, the gas pressure in the interior space 8 leads to the annular seal 5 being moved in the direction of the end wall 2. In the process, the annular seal 5 passes into the region of the grooves 14. In this position, the interior space 8 is connected to the environment via the grooves 14, so that the gas located in the interior space can escape outwards in order thus to reduce the excess pressure produced in the interior space 8 by the action of heat.

Figure 3:
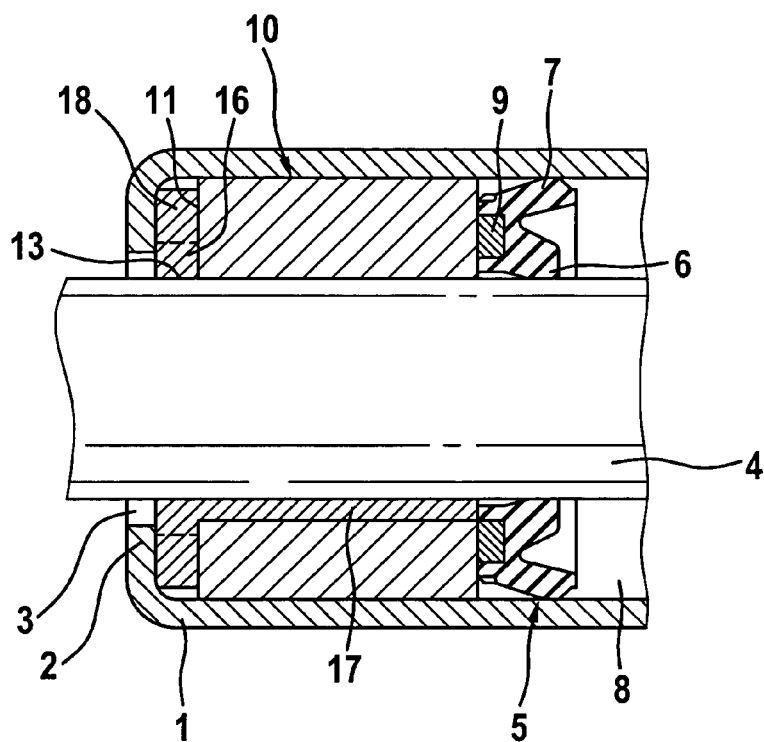
FIG. 3 shows a detail of a side view of a second exemplary embodiment of the adjusting element in the normal position, in section.

The supporting element in FIG. 3 has a supporting disc 16 on which the precision zinc alloy is arranged. The supporting disc 16 is supported on the end wall 2. A pin-like plunger 17 is connected in one piece with the supporting disc 16. The plunger 17 extends axially next to the piston rod 4 from the supporting disc 16 directly up to the annular seal 5 in the region of its inner sealing lip 6.

Figure 4:
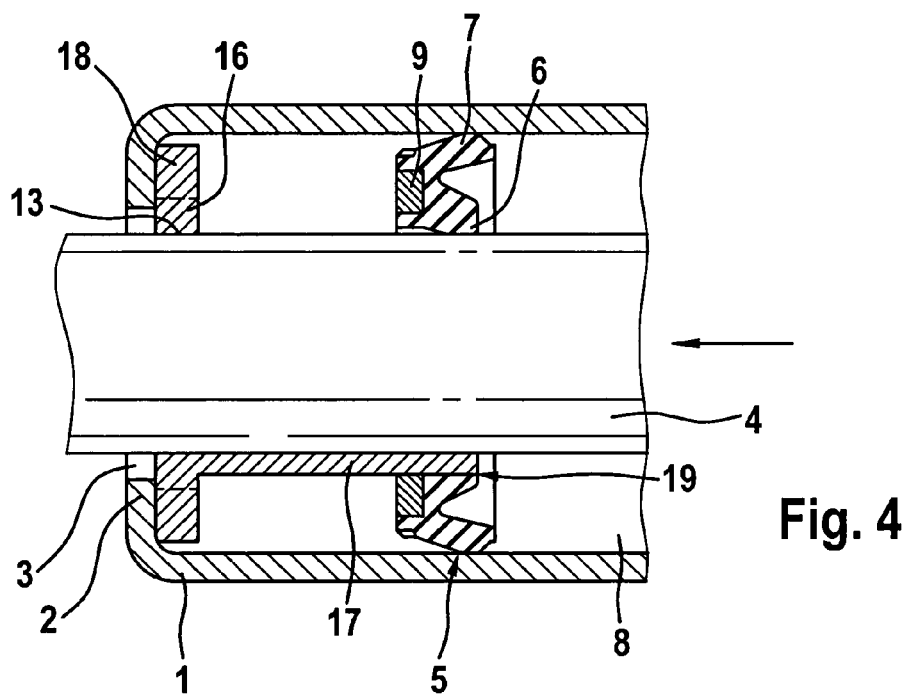
FIG. 4 shows the adjusting element according to FIG. 3 after thermal overloading.

During thermal overloading according to FIG. 4, the precision zinc alloy melts and passes through apertures 18 to the environment. With the decreasing axial length of the supporting element 10 as a result of the melting, the annular seal 5 moves in the direction of the end wall 2 as a result of the gas pressure in the interior space 8. Due to this movement, the annular seal 5, in the region of its inner sealing lip 6, is acted upon by the plunger 17 in such a way that, in the region of the plunger 17, the sealing lip 6 is pierced by the plunger 17 and a passage opening 19 is produced from the interior space 8 via the apertures 18 to the environment.

Via this passage opening 19 and the apertures 18 in the supporting disc 16, the gas can escape from the interior space 8 into the environment, as a result of which the gas pressure in the interior space 8 is reduced.

Figure 5:
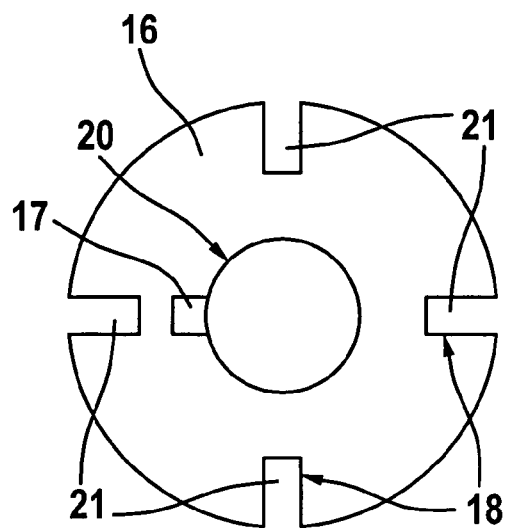
FIG. 5 shows an end view of the supporting disc of the supporting element according to FIG. 3.

The supporting disc 16 in FIG. 5 has a coaxial hole 20 for accommodating the piston rod 4. The plunger 17 running parallel to the piston rod 4 is arranged at this coaxial hole 20. Apertures 18 in the form of four slots 21 uniformly arranged at a distance apart of 90° are provided in the supporting disc 16. The slots 21 extend radially inwards from the radially outer margin of the supporting disc 16. The radial length of the slots 21 amounts to one third of the radius of the supporting disc 16.

Figure 6:
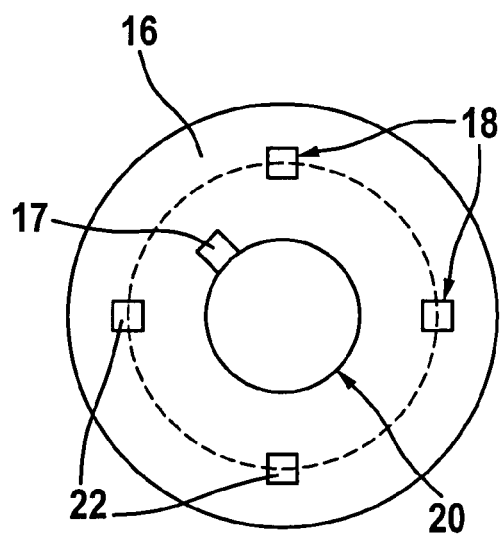
FIG. 6 shows a second embodiment of the supporting disc of the supporting element according to FIG. 3.

The apertures 18 in the supporting disc 16 in FIG. 6 are arranged in a ring shape around the hole 20. The apertures 18 are designed as rectangles 22 having a small lateral length, as a result of which sufficient stability of the supporting disc 16 is ensured.

What is claimed is:

1. An adjusting element comprising:
    a cylinder having an end wall, an inner wall, and an interior space containing a pressure medium;
    a piston rod projecting from the end wall of the cylinder;
    an annular seal centered about an axis and having an inner circumference which bears against the piston rod, an outer circumference which bears against the inner wall of the cylinder, a side facing the interior space, and a side remote from the interior space;
    a supporting element having a first end which supports the annular seal, a second end supported on the end wall of the cylinder, and an axial length between said ends, the supporting element being made of a material which melts or sublimes at a predetermined temperature so that the axial length of the supporting element is shortened during thermal overloading;
    a supporting disk located between the end wall of the cylinder and the second end of the supporting element;
    a stop axially extending from the annular seal to the supporting disk, the stop comprising material having a melting temperature higher than the predetermined temperature of melting or subliming of the supporting element and being configured to pierce the inner circumference of the seal when said supporting element melts or sublimes at said predetermined temperature so that the seal is displaced radially outwards; and
    a passage from the interior space to atmosphere which opens when the seal is radially displaced when said supporting element melts or sublimes at said predetermined temperature.

2. The adjusting element of claim 1, wherein the supporting element is made from one of a metal and a metal alloy.

3. The adjusting element of claim 2, wherein said metal is zinc and said metal alloy is zinc alloy.

4. The adjusting element of claim 1, wherein the supporting element is made of a thermoplastic material.

5. The adjusting element of claim 1, wherein the stop is a pin-like plunger which does not melt or sublime at the predetermined temperature.

6. The adjusting element of claim 5, wherein the supporting disk has axially continuous apertures.

7. The adjusting element of claim 6, wherein the apertures of the supporting disk are radially open slots.

8. The adjusting element of claim 7, wherein the supporting disk has a radially outer margin, said radially open slots extending radially inward from the margin.

9. The adjusting element of claim 7, wherein the slots have a radial length which amounts to one-third of the radius of the supporting disk.

10. The adjusting element of claim 6, wherein the slots are uniformly distributed on a circle.

11. The adjusting element of claim 1, wherein the stop and the supporting disk are formed as one piece.

12. The adjusting element of claim 1, further comprising a stabilizing ring in the annular seal, the stabilizing ring having less flexibility than the annular seal, the stop moving axially past the stabilizing ring when said supporting element melts or sublimes at said predetermined temperature.

* * * * *